United States Patent
Yoon et al.

(10) Patent No.: US 9,805,752 B2
(45) Date of Patent: Oct. 31, 2017

(54) SELECTIVE WRITE POWER VARIABILITY FOR MAGNETIC RECORDING

(71) Applicant: Seagate Technology LLC, Cupertino, CA (US)

(72) Inventors: Jung Min Yoon, Gyeonggi-do (KR); Jae Myung Chung, Gyeonggi-do (KR); Hwajun Kim, Gyeonggi-do (KR)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/938,298

(22) Filed: Nov. 11, 2015

(65) Prior Publication Data

US 2017/0133047 A1 May 11, 2017

(51) Int. Cl.
G11B 5/027 (2006.01)
G11B 5/60 (2006.01)
G11B 5/09 (2006.01)
G11B 20/12 (2006.01)

(52) U.S. Cl.
CPC ............ *G11B 5/6041* (2013.01); *G11B 5/09* (2013.01); *G11B 5/6082* (2013.01); *G11B 20/1217* (2013.01); *G11B 2020/1238* (2013.01)

(58) Field of Classification Search
CPC ...................................................... G11B 5/09
See application file for complete search history.

(56) References Cited

U.S. PATENT DOCUMENTS

| 7,193,807 | B1 * | 3/2007 | Liikanen | G11B 5/4826 360/76 |
| 8,300,345 | B2 | 10/2012 | Carson | |
| 8,867,161 | B2 * | 10/2014 | Emo | 360/58 |
| 8,941,943 | B1 * | 1/2015 | Coker | G11B 5/012 360/48 |
| 9,111,578 | B1 | 8/2015 | Hassel et al. | |
| 9,318,139 | B2 * | 4/2016 | Ong | G11B 5/59633 |

OTHER PUBLICATIONS

U.S. Appl. No. 14/685,417, filed Apr. 13, 2015.
U.S. Appl. No. 14/686,456, filed Apr. 14, 2015.

* cited by examiner

*Primary Examiner* — K. Wong
(74) *Attorney, Agent, or Firm* — Holzer Patel Drennan

(57) ABSTRACT

A storage device includes a storage controller that controls a writer to generate a magnetic field at an air-bearing surface (ABS) of a storage medium and to selectively alter a strength of the magnetic field by a predetermined amount when writing data to select data tracks on the storage medium.

20 Claims, 6 Drawing Sheets

SELECTIVE WRITE POWER VARIABILITY FOR MAGNETIC RECORDING

BACKGROUND

Consumer demand drives continuing innovation of storage devices of decreasing size and increased storage capacity. In the case of disc-based storage mediums, the term areal density capability (ADC) may refer to a product of a number of data tracks on a disc (e.g., tracks per inch (TPI)) and a number of data bits along each data rack (e.g., bits per inch (BPI)). The tracks per inch value is sometimes referred to as "radial density", while the bits per inch value may be referred to as the "recording density", "bit density", or "linear density." As TPI and BPI values increase, read heads have greater difficulty accurately reading data from the data tracks, resulting in a higher bit error rate (BER). If the BER becomes too high, storage device performance may suffer as error correction and read retry operations are performed. Therefore, some data storage devices are configured with preset TPI and BPI values selected to achieve a high ADC while maintaining an acceptable BER. A number of challenges are associated with increasing drive TPI and BPI beyond current limits.

BRIEF DESCRIPTIONS OF THE DRAWINGS

SUMMARY

One implementation of the disclosed technology provides a storage controller that controls a writer to generate a magnetic field at an air-bearing surface (ABS) of a storage medium and to selectively alter the strength of the magnetic field by a predetermined amount when writing data to select data tracks on the storage medium.

According to another implementation, a storage device controller disclosed herein increases fly height of a writer by a predetermined amount when writing data to select data tracks on a storage medium to decrease a written width of select data tracks. According to yet another implementation, a storage device controller alters a write current parameter by a predetermined amount when writing to select data tracks on a storage medium to decrease a written width of the select data tracks.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

Figure 1:
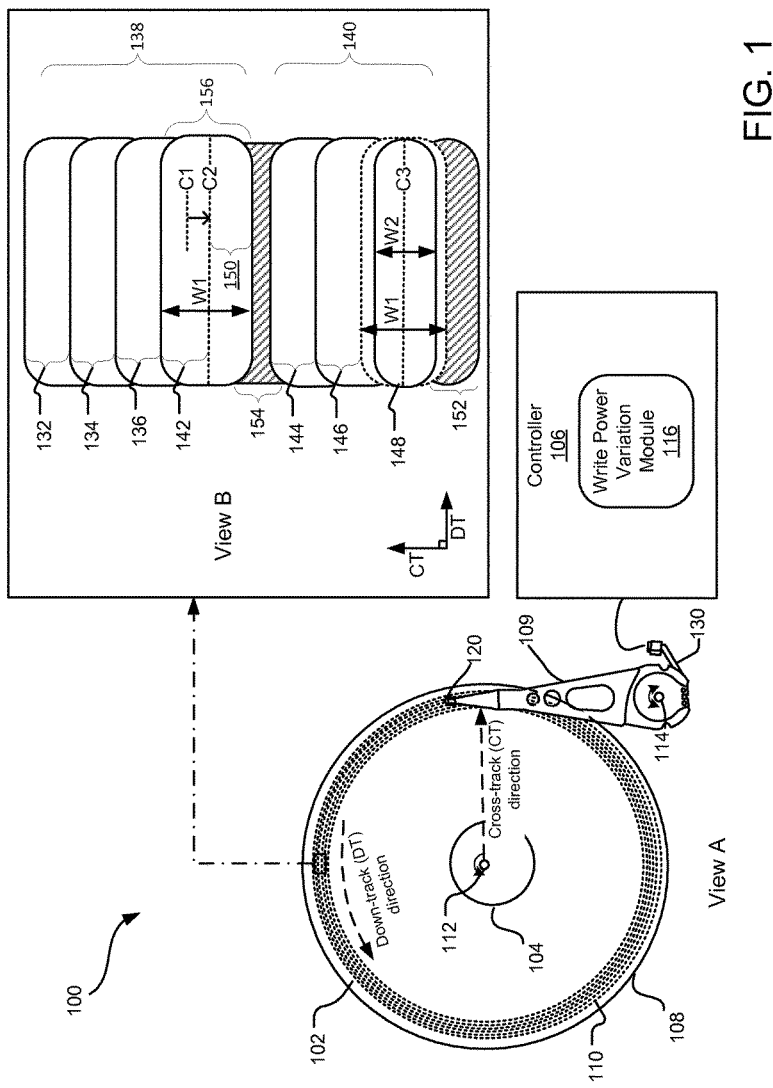
FIG. 1 illustrates a data storage device including a transducer head assembly for writing data on a magnetic storage medium.

FIG. 1 illustrates a data storage device 100 including a transducer head assembly 120 for writing data on a magnetic storage medium 108. Although other implementations are contemplated, the magnetic storage medium 108 is, in FIG. 1, a magnetic storage disc on which data bits can be recorded using a magnetic write pole (not shown) and from which data bits can be read using a magnetoresistive element (not shown). As illustrated in View A, the magnetic storage medium 108 rotates about a spindle center or a disc axis of rotation 112 during rotation, and includes an inner diameter 104 and an outer diameter 102 between which are a number of concentric data tracks 110. Information may be written to and read from data bit locations in the data tracks on the magnetic storage medium 108.

The transducer head assembly 120 is mounted on an actuator assembly 109 at an end distal to an actuator axis of rotation 114. The transducer head assembly 120 flies in close proximity above the surface of the magnetic storage medium 108 during disc rotation. The actuator assembly 109 rotates during a seek operation about the disc axis of rotation 112. The seek operation positions the transducer head assembly 120 over a target data track for read and write operations.

A writer (not shown) of the transducer head assembly 120 converts a series of electrical pulses sent from a controller 106 into a series of magnetic pulses of commensurate magnitude and length, and the magnetic pulses selectively magnetize magnetic grains of the magnetic storage medium 108 as they pass below the transducer head assembly 120.

The controller 106 includes software and/or hardware, and may be implemented in any tangible computer-readable storage media within or communicatively coupled to the data storage device 100. The term "tangible computer-readable storage media" includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can accessed by mobile device or computer. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal.

In FIG. 1, the controller 106 includes (or is communicatively coupled to) a write power variation module 116. The write power variation module 116 controls the transducer head assembly 120 to selectively increase or decrease write power when writing to select data tracks on the magnetic storage medium 108. As used herein, "write power" refers to strength of a magnetic field produced by a writer (also referred to as a write element) as measured on an air-bearing surface (ABS) of the magnetic storage medium 108. Altering write power can also impact the width of a corresponding written write track. For this reason, selective variance of write power can impact a number of tracks per inch (TPI) on the storage medium 108. In one implementation, the write power variation module 116 selectively increases and decreases write power when writing data to select data tracks.

Altering write power can be accomplished in different ways. In one implementation, the write power variation module 116 increases or decreases write power by altering a clearance between the transducer head assembly 120 and the storage medium 108. In another implementation, the write power variation module 116 selectively increases or decreases write power by altering a write current parameter. As used herein, "write current parameter" refers to a parameter setting that influences shape or size of a magnetic pulse produced by a writer of the transducer head assembly 120.

The following discussion details an example data management scheme employing the write power variation module 116 to improve drive overhead and recording capacity in a shingled magnetic recording system. It should be understood that the example functions served by the write power variation module 116 may also be useful in implementing a variety of other data management schemes not discussed herein, including those with applications in systems that do not utilize shingled magnetic recording.

View B illustrates data tracks of the magnetic storage medium 108 when the data tracks are storing data according to a shingled magnetic recording (SMR) technique. In general, SMR is one way to decrease the size of data cells on the magnetic storage medium 108 without a corresponding decrease in the size of a writer on the transducer head assembly 120. In SMR systems, a magnetic field produced by the writer is strong enough to affect two adjacent data tracks on the magnetic storage medium 108 on a single pass of the writer. In other words, a magnetic footprint 156 (e.g., an area of the storage medium magnetically polarized by the writer on a single pass) may be defined to correspond to two different data tracks on the magnetic storage medium 108. For example, the magnetic footprint 156 has a width W1 that is equal in width to a width of data tracks 132 and 134 combined. Therefore, an initial write to the data track 132 incidentally magnetizes (e.g., corrupts) data on the adjacent data track 134. The corrupted data in the data track 134 can be corrected on a subsequent pass of the writer over the data track 134, but this data write to the data track 134 in turn corrupts data on data track 136, and so on.

To manage data despite the above-described overlap, data tracks on the data storage device 100 are generally grouped into data bands (e.g., data bands 138, 140), where each data band is separated from other adjacent data bands by one or more guard tracks (e.g., guard tracks 152 and 154) where no data is stored. In an example write operation of the data track 132, the storage device 100 reads all data tracks in the associated data band 138 (e.g., including data tracks 132, 134, 136, and 142) into a memory location in a consecutive order. In memory, the data storage device 100 updates the one or more data cells to be changed by the write operation and then re-writes, in a consecutive order, the data tracks 132, 134, 136, and 142 including the one or more updated cells.

Since the width W1 of the writer's magnetic footprint 156 corresponds to two data tracks, a pass of the writer over the last data track in a band (e.g., a data track 142) may affect some data region below it (e.g., a data region 150) where no meaningful data is actually stored. Due to inclusion of this extra space, the data tracks 142 and 148 are also referred to herein as "FAT data tracks." If the write center of the FAT data track 142 is defined by an axis C1, the data region 150 is potentially wasted space. If, on the other hand, the write center of the FAT data track 142 is shifted slightly to a position C2, a number of techniques can be realized to boost ADC of the magnetic storage medium 108.

First, shifting the center of the FAT data track 142 away from the adjacent data-storing tracks 136 (e.g., from position C2 to C1, as shown with respect to track 142) reduces a risk of adjacent track interference (ATI) to the immediately adjacent data track. For example, shifting the center of the FAT data track 142 away from the data track 136 reduces a risk of ATI to the data track 136. As a result, a linear density (bits per inch, BPI) of the FAT data tracks can be increased as compared to other data tracks in the data band 138 without increasing the observed ATI or bit error rate (BER). This allows for a net increase in BPI on the data storage medium. This is technique is explored in greater detail with respect to FIG. 2.

In one implementation, the center of the data track 148 is shifted away from the adjacent data-storing track, as described above. After this shift, a write center of the data track 148 is defined by the axis C3. Write power is then decreased when writing to the data track 148 to further increase ADC of the storage medium and reduce SMR overhead.

For example, when data is written to the data track 148, the magnetic footprint 156 of the writer can be reduced from a width W1 to a smaller width W2, as shown. This reduction in the magnetic footprint width (W1 to W2) is accomplished by reducing write power (e.g., a strength of the magnetic field of the writer at the ABS) during the write operation, such as by increasing clearance between the magnetic storage medium 108 and the transducer head assembly 120 or by reducing a write current parameter. Although the width W2 is smaller than W1, a total width spanned by data of the last data track 148 is still greater than the other data tracks in the data band (e.g., data tracks 144, 146), which each include data bits spanning approximately ½ of W1. Decreasing the magnetic footprint of the writer (as shown) when writing to the last data track in each SMR data band 138, 140 allows the data bands to be spaced closer together, increasing a total TPI on the storage medium.

In some implementations, the write power variation module 116 selectively alters strength of a magnetic field incident on the storage medium when writing to select tracks other than or in addition to the last data tracks (e.g., 142, 148) in each of a number of SMR data bands. In one example alternate implementation, the write power variation module 116 selectively decreases power incrementally when sequentially writing to the data tracks 144, 146, 148 so that the data track 144 has a greater written track width than the data track 146 and the data track 146 has a greater written track width that the data track 148. In still another implementation, write power variation module 116 is implemented in a device that does not utilize SMR. For example, the write power variation module 116 may selectively decrease strength of a magnetic field incident on the storage medium when writing to select data tracks in a conventional magnetic recording device or when writing to every-other data track on a storage medium, such as in a storage device implementing an interlaced magnetic recording technique.

Figure 2:
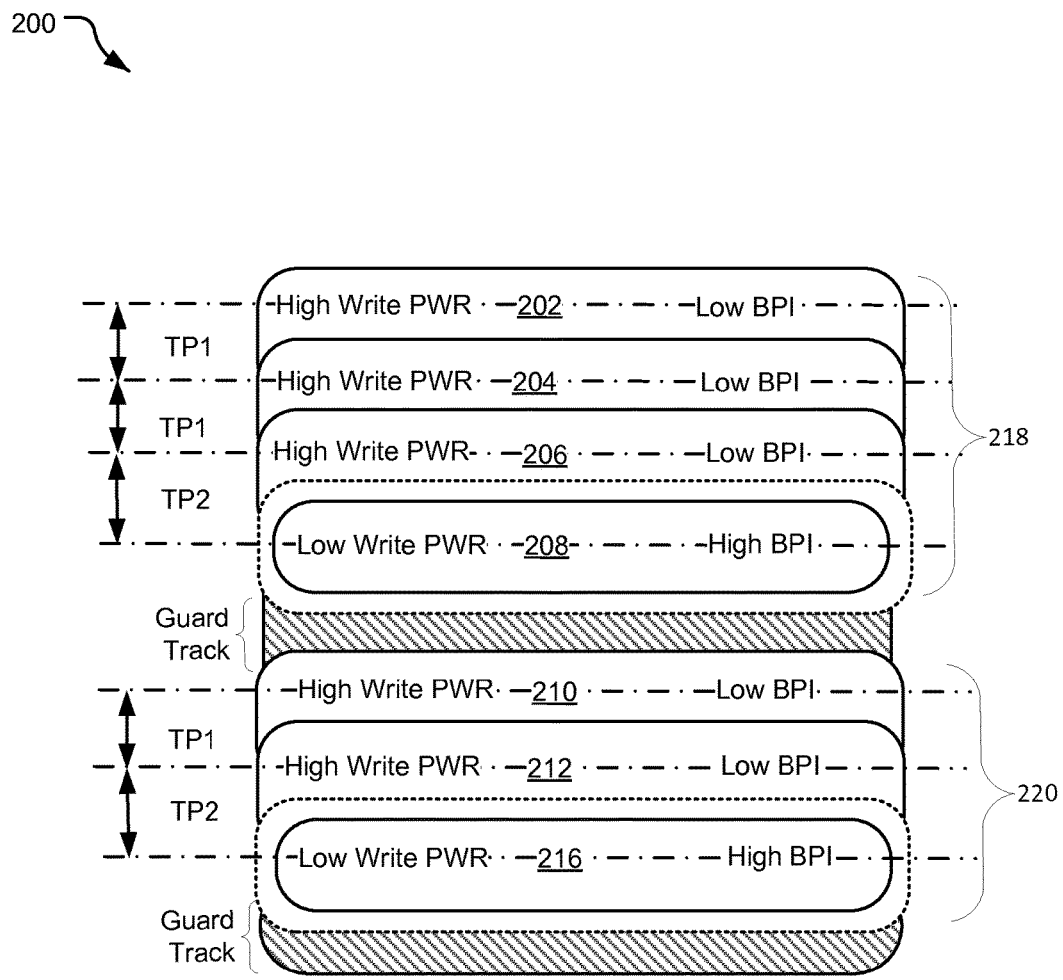
FIG. 2 illustrates techniques for selectively altering write power to increase areal density capability (ADC) of a magnetic storage medium.

FIG. 2 illustrates further techniques for selectively altering write power to increase ADC on a magnetic storage medium 200 in a shingled magnetic storage system. The shingled magnetic storage system includes a number of data tracks organized into data bands (e.g., data bands 218 and 220) such that each data band is separated from the immediately adjacent data band by guard tracks where no data is stored.

In FIG. 2, a last data track in each of the data bands 218 and 220 is defined to have a different track pitch (TP) than other tracks of the data bands. As used herein, the "track pitch" refers to a distance between write centers of two immediately adjacent data tracks (e.g., write centers indicated by dotted lines in FIG. 2). For example, the data track 208 has a write center separated from the write center of the nearest adjacent data track 206 by a track pitch TP2, which is larger than a track pitch TP1 of other adjacent data tracks in the same data band 218. Due in part to this slight adjustment in track pitch, there is decreased risk that a data write to the data track 208 will incidentally corrupt data on the adjacent track 206 through adjacent track interference (ATI). For this reason, linear density and write power can be manipulated during data writes to the data tracks 208 and 216 to increase ADC of the storage medium 200.

In one implementation, the linear density (BPI) of the data tracks 208 and 216 is increased as compared to the other data tracks in the data band. In the same or another implementation, a controller of the shingled magnetic storage system selectively decreases write power when writing data to the data tracks 208 and 216. Although this decrease in write power decreases the size of the writer's magnetic footprint (as seen by the difference in dotted and solid track outlines of the data tracks 208 and 216), a bit error rate (BER) of data read back from the last data tracks 208 and 216 is still within an acceptable range due to the increased associated track pitch (TP2). Accordingly, decreasing the write power to resize the last data track in each data band (as shown) saves space on the magnetic storage media 200, allowing for the data bands to be placed closer together. This results in a net increase in total TPI of the magnetic storage medium 200.

Figure 3:
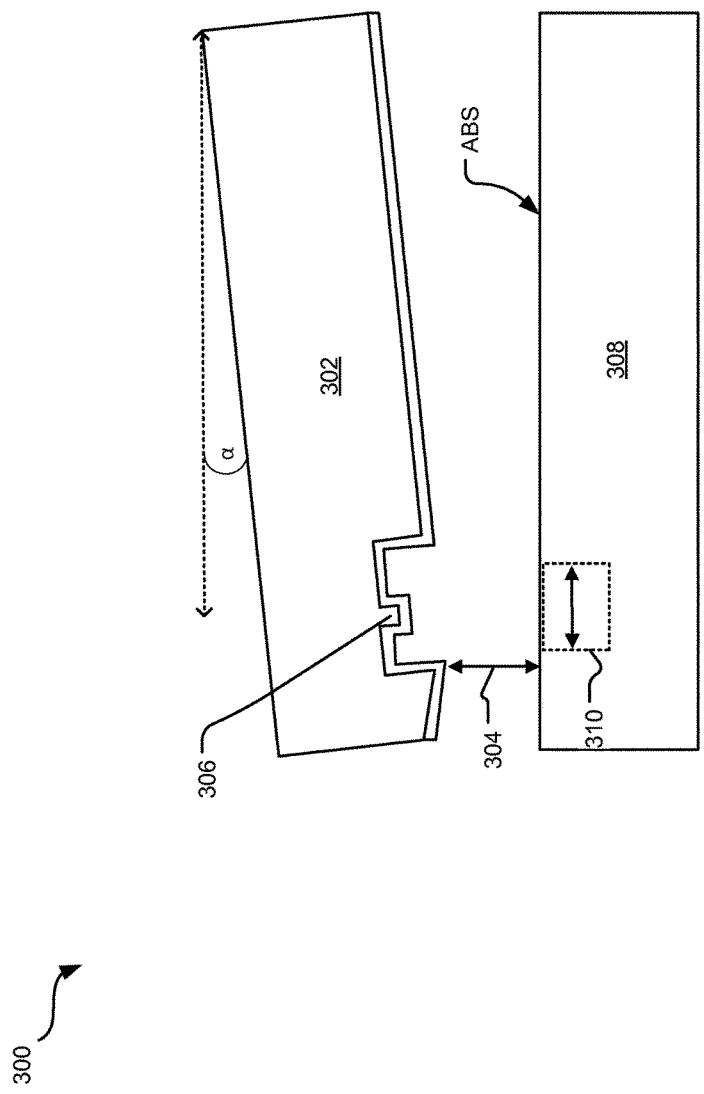
FIG. 3 illustrates one example technique for selectively altering write power when writing to certain tracks on a storage medium.

FIG. 3 illustrates an example of altering a clearance 304 between a transducer head 302 and a storage medium 308 in a storage device 300 when writing to select data tracks on the storage medium 308. An increase in the clearance 304 causes a proportional decrease in write power (e.g., strength of a magnetic field produced by a writer 306 and measured at an ABS of the storage medium 308). That is, as the clearance 304 or "fly height" is increased, an area 310 on the of the storage medium 300 capable of being magnetically polarized by a pass of the writer 306 shrinks In contrast, a decrease in the clearance 304 is proportional to an increase in size of the area 310 capable of being magnetically polarized by a pass of the writer 306. Notably, a decrease in the clearance 304 corresponds to an increase in a pitch angle a of the transducer head 302, while an increase in the clearance 304 corresponds to an increase in the pitch angle α.

According to one implementation of the disclosed technology, the clearance 304 is selectively decreased during data writes to a last data track in each SMR data band. For example, the clearance 304 may be decreased by an amount sufficient to reduce write power by about 20%.

Figure 4:
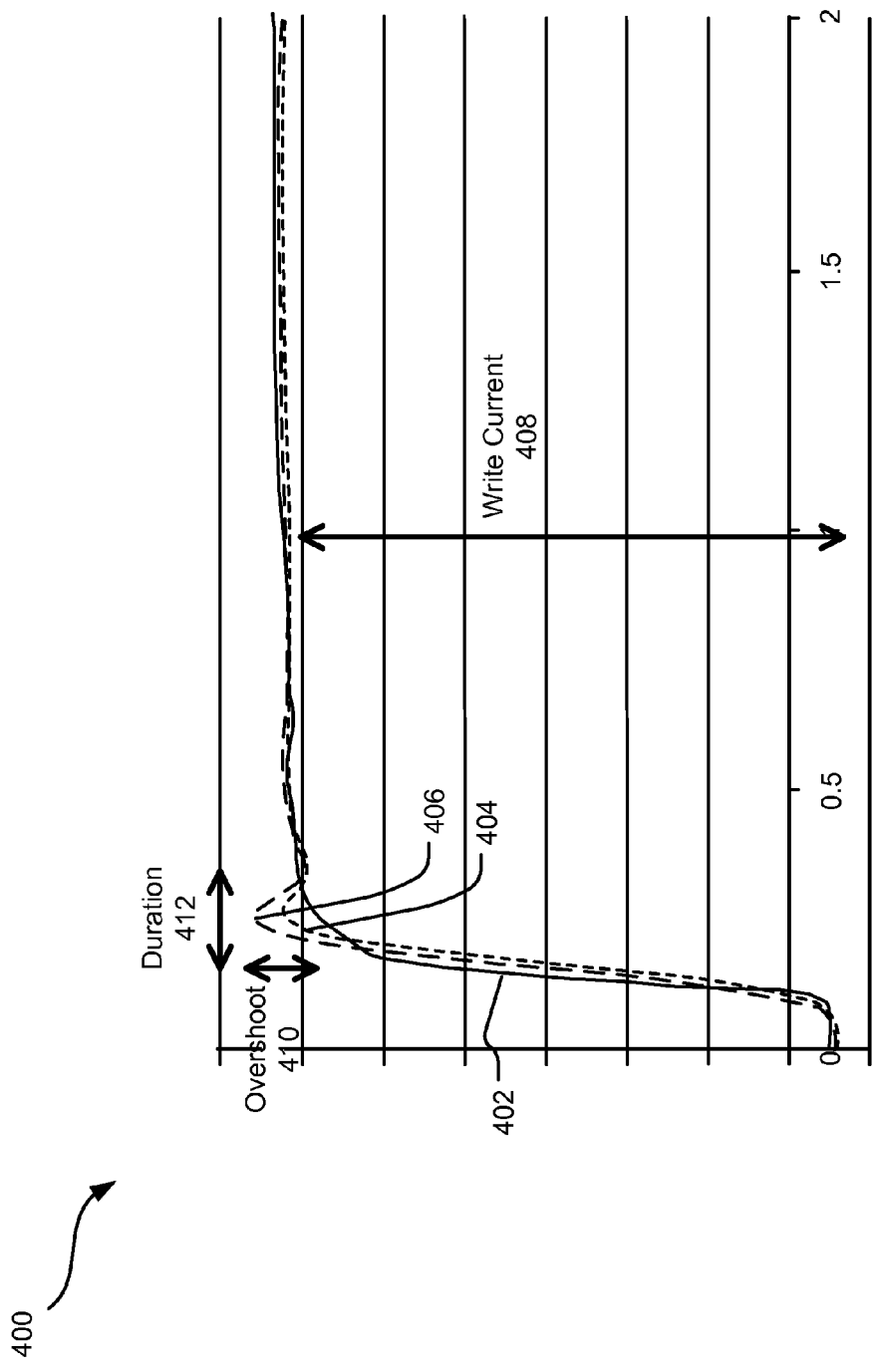
FIG. 4 illustrates a plot illustrating example write current parameters that may be altered to decrease write power when writing to select data tracks on a storage medium.

FIG. 4 illustrates a plot 400 illustrating example write current parameters that may be altered to decrease write power when writing to select data tracks on a storage medium (not shown). In particular, the plot 400 illustrates overlaid example write current pulses 402, 404, 406. Each pulse is defined by a steady state write current (e.g., write current 408), an overshoot 410, and a duration 412 for the overshoot 410. Write power (as measured at the ABS) is selectively decreased when one or more of the illustrated write current parameters (e.g., the write current 408, the overshoot 410, or the duration 412) are also decreased. In one implementation, one or more of the illustrated write current parameters are selectively decreased when writing data to a last data track in each SMR data band. The magnitude of this decrease is determined by specific details of the transducer head, media design, and corresponding data rate. In one implementation, the write power (e.g., as measured at the ABS) is decreased by about 20% when writing to the last data track in each data band as compared to the other data tracks in the corresponding data band. This decrease in write power ultimately allows for an increase in the number of data tracks on the storage medium (tracks per inch, TPI).

Figure 5:
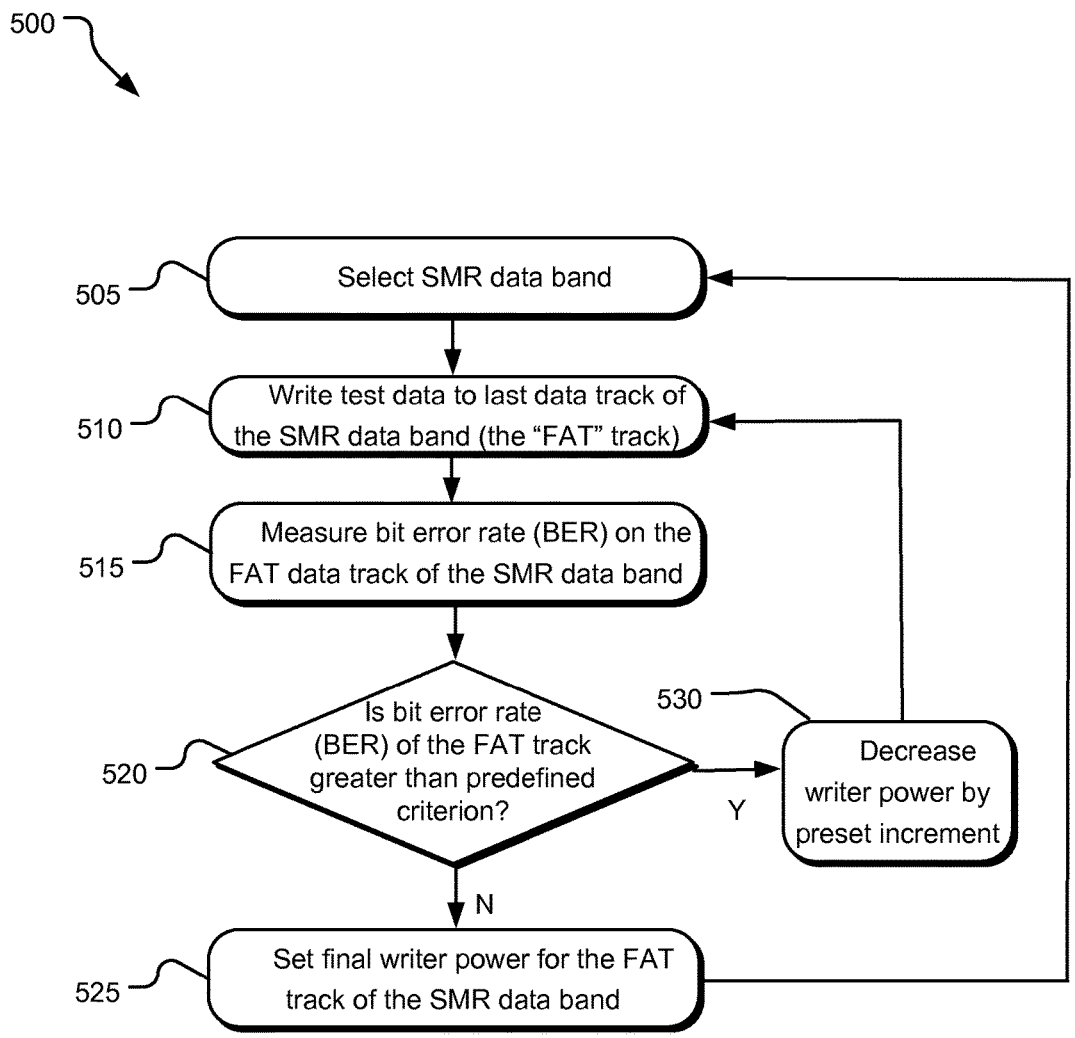
FIG. 5 illustrates example operations for selecting a write power for use in association with select data tracks of a storage device.

FIG. 5 illustrates example operations 500 for selecting write power in association with select data tracks of a storage device. In one implementation, the operations of FIG. 5 occur during a factory formatting process. A first selection and measuring operation 505 selects an SMR data band on the storage medium. A test write operation 510 writes test data to a last data track of the SMR data band (e.g., the "FAT" data track). A measuring operation 515 reads the test data from the FAT data track of the SMR data band and measures a bit error rate (BER). A determination operation 520 determines whether the measured BER is greater than some predefined criterion. In one implementation, the predefined criterion corresponds to a number of read errors close to or including a maximum number of acceptable errors (or range of acceptable errors) that can still be corrected by an error correction code of the storage device. If the measured BER of the FAT track is still greater than the predefined criterion, a write power adjustment operation 530 decreases write power and the writing operation 510 again writes the test data to the FAT data track. The measuring operation 515 re-measures the resulting BER of the FAT data track. The operations 510, 515, 520, and 530 repeat until the measured BER of the FAT track is less than or equal to the predefined criterion. At this point, a setting operation 525 records the current write power in association with the FAT data track. For example, the current write power may be stored in association with the FAT data track in a firmware table of the data storage device.

In one implementation, the operations 505 through 530 repeat for each "FAT" track on the data storage device, until a pre-determined write power is saved in association with each FAT data track of the data storage device. The write power values may be stored directly or indirectly, such as in the form of writer-media clearance values or one or more write current parameters sufficient to generate the write power. Other operations (not shown) may define the boundaries for each data band and the amount of isolation (guard track width) between adjacent data bands.

Figure 6:
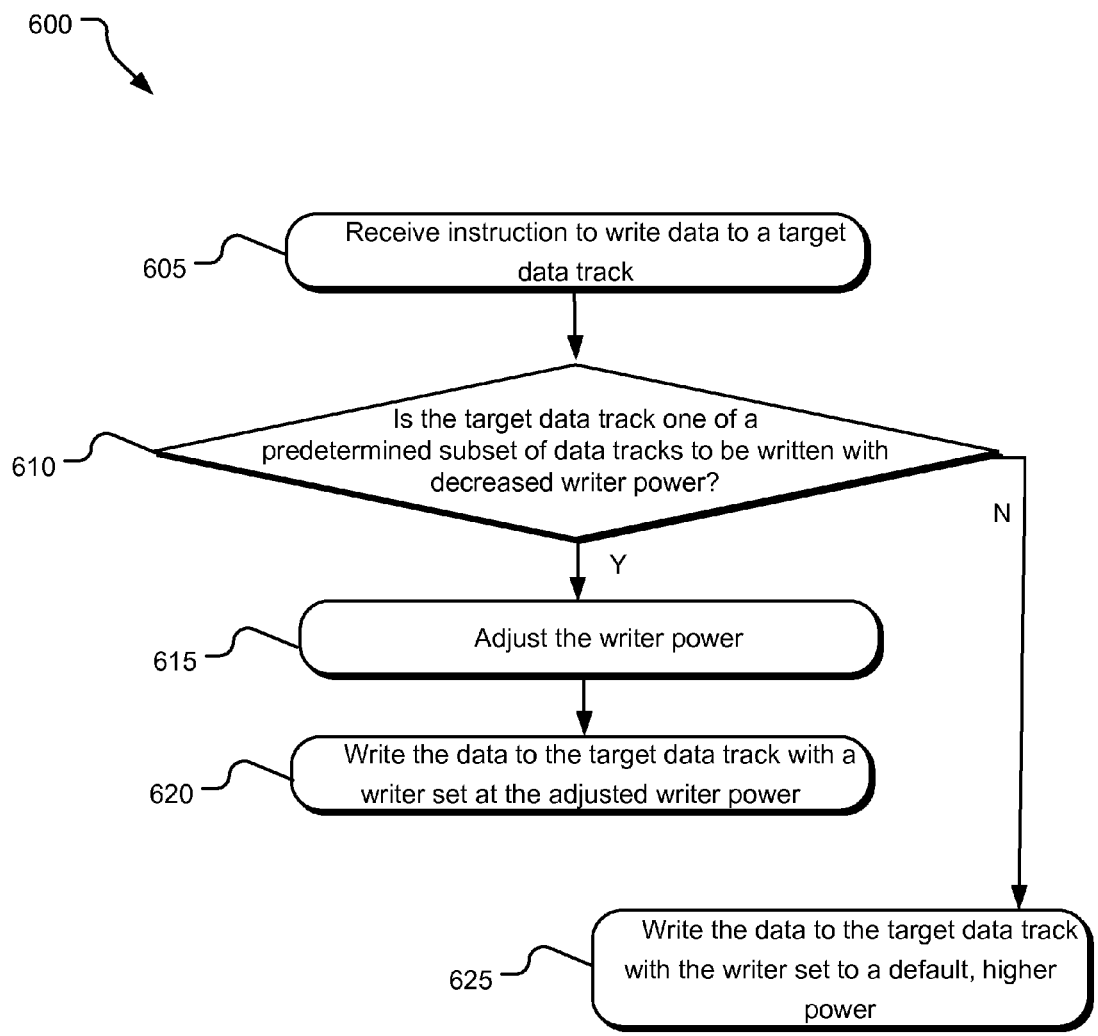
FIG. 6 illustrates example operations for dynamically adjusting write power when writing to select data tracks on a storage medium.

FIG. 6 illustrates example operations 600 for dynamically adjusting write power when writing to select data tracks on a storage medium. A receiving instruction 605 receives an instruction to write data to a target data track. A determination operation 610 determines if the target data track belongs to a predetermined subset of data tracks associated, in memory, with a decreased write power. For example, the storage medium may be implemented in a shingled magnetic recording system and the last data track (e.g., the FAT track) of each data band may be designated as a data track that is to be written at lower write power than the other data tracks in the associated data band. The determination operation 610 may be performed, for example, by accessing a table stored in firmware of the storage device and identifying a write current parameter or a clearance parameter associated with the target data track.

If the target data track does not belong to the predetermined subset of data track associated with the lower write power, a write operation 625 writes the to the target data track at a default write power. If, on the other hand, the determination operation 610 determines that the target data track does belong to the predetermined subset of data tracks, the write power adjustment operation 615 adjusts the write power to a value other than the default value. In one implementation, the write power adjustment operation 615 decreases write power by increasing a clearance between the storage medium and a transducer head. In another implementation, the write power adjustment operation 615 adjusts write power by decreasing a write power parameter such as current, overshoot, or duration. A writing operation 620 writes the data to the target data track with the adjusted write power.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. Apparatus comprising:
   a storage controller that controls a writer to generate a magnetic field at an air-bearing surface (ABS) of a storage medium and selectively alters a strength of the magnetic field incident on the ABS by a predetermined amount when writing data to a last data track in a data band of shingled magnetic data tracks on the storage medium.

2. The apparatus of claim 1, wherein the storage controller writes data consecutively to consecutive data tracks in the data band and decreases the strength of the magnetic field when writing to the last data track in the data band.

3. The apparatus of claim 1, wherein the storage controller alters the strength of the magnetic field by altering a fly height of a writer by a select amount.

4. The apparatus of claim 2, wherein the magnetic field is of a lower strength at the ABS when writing data to the last data track in the series than when writing to other data tracks in the series.

5. The apparatus of claim 2, wherein the last data track in the data band has a wider written track width than all other data track on the storage medium.

6. The apparatus of claim 1, wherein selectively altering the strength of the magnetic field further comprises:
   increasing a clearance between a writer and the ABS.

7. The apparatus of claim 1, wherein the storage controller is further configured to increase a linear density of data when writing to the last data track in the data band as compared to all other data tracks in the data band.

8. The apparatus of claim 1, wherein selectively altering the strength of the magnetic field further comprises:
   decreasing a write current provided to a writer of the storage device.

9. The apparatus of claim 1, wherein the last data track in the data band is defined to have a different track pitch than other data tracks of the data band.

10. Apparatus comprising:
    a storage device controller configured to increase fly height of a writer by a predetermined amount when writing data to select data tracks on a storage medium to decrease a written width of the select data tracks.

11. The apparatus of claim 10, wherein the storage device controller increases the fly height in order to decrease strength of a magnetic field at an air-bearing surface (ABS) of the storage medium by a predetermined amount.

12. The apparatus of claim 10, wherein the storage device controller is further configured to set the fly height to a first value when writing to a first data track and set the fly height to a second value when writing data to a second adjacent data track.

13. The apparatus of claim 10, wherein the storage device controller is further configured to write data consecutively to consecutive data tracks in a series and to increase the fly height to write data to a last data track in the series.

14. The apparatus of claim 11, wherein the consecutive data tracks in the series form a data band in a shingled magnetic recording (SMR) system.

15. Apparatus comprising:
    a storage device controller that alters a write current parameter by a predetermined amount when writing data to a last data track in a data band of shingled magnetic data tracks on a storage medium to decrease a written width of the last data tracks.

16. The apparatus of claim 15, wherein the storage device controller is further configured to write data consecutively to consecutive data tracks in the data band with the write current parameter set to a first value and to write data to the last data track in the data band with the write current parameter set to a second decreased value.

17. The apparatus of claim 15, wherein the storage controller alters the strength of the magnetic field by altering a fly height of a writer by a select amount.

18. The apparatus of claim 15, wherein the last data track is defined to have a different track pitch than other data tracks of the data band.

19. The apparatus of claim 15, wherein the storage device controller is further configured to increase a linear density of data when writing to the last data track of the data band.

20. The apparatus of claim 15, wherein the write current parameter is at least one of write current amplitude, overshoot, and duration.

* * * * *